United States Patent Office 3,489,898
Patented Jan. 13, 1970

3,489,898
METHOD AND MEANS FOR PENETRANT INSPECTION OF LOX-WETTED PARTS USING A NONVOLATILE FLUOROCARBON PENETRANT AND DEVELOPER CARRIER
James R. Alburger, 5007 Hillard Ave.,
La Canada, Calif. 91011
No Drawing. Filed Aug. 14, 1967, Ser. No. 660,185
Int. Cl. G01n 21/16, 21/38
U.S. Cl. 250—71         12 Claims

ABSTRACT OF THE DISCLOSURE

An inspection penetrant process which utilizes penetrants, solvent removers and developers which are all non-reactive to liquid oxygen (LOX). The penetrant and developer components of the system employ a basic carrier constituent which consists of a fluorinated hydrocarbon oil or grease material extended with a volatile halocarbon diluent. The fluorocarbon oil or grease acts as a carrier for indicator dyes present in the penetrant, and renders such dyes nonreactive to LOX. The volatile constituent of the penetrant, upon removal by evaporation, permits the effective dimensional sensitivity of the penetrant to be increased, while the penetrant material remains LOX-nonreactive.

RELATED PATENTS AND PATENT APPLICATIONS

U.S. Patent No. 3,107,298, "Apparatus for the Measurement of Fluorescent Tracer Sensitivity"; U.S. Patent No. 3,184,596, "Flaw Detection Method Using a Liquid Solvent Developer"; U.S. Patent No. 3,300,642, "Method for Changing and Restoring the Sensitivity Characteristic of Diluted Penetrants"; U.S. Patent No. 3,386,920, "Process for Fluorescene Detection of Extremely Small Flaws"; application Ser. No. 444,660, filed Apr. 1, 1965, now Patent No. 3,228,208 for "Dual-Sensitivity Inspection Penetrants"; and application Ser. No. 699,536, filed Jan. 22, 1968, for "Method of Masking Fluorescene in Fluorescent Dye Tracer Inspection Process Materials."

This invention relates to penetrant inspection processes. More particularly, the invention relates to a method and means for penetrant inspection of parts which are to be wetted in use with liquid oxygen (LOX).

Conventional penetrant inspection processes, as used for inspection of aircraft structural members, engine parts, bearings, and the like, to detect small but potentially dangerous surface defects, generally utilize an oily penetrating liquid containing a dissolved indicator dye which may be either fluorescent or nonfluorescent. The oily penetrant is applied to the surface of the test part, where it enters any surface cracks which may be present, forming penetrant entrapments. Surface penetrant is removed by use of a suitable solvent remover or emulsifier and water-wash, and the residual entrapments of penetrant are detected by examination under white light or ultraviolet light depending on the type of indicator dye. In some cases, the residual entrapments of penetrant are drawn out of the surface flaws onto a developer which acts to enhance the visibility of the dyed penetrant liquid in the vicinity of the surface flaws.

Where the parts to be inspected are to be used in contact with LOX, conventional oily penetrants cannot be used safely for the reason that explosive reactions may take place between the LOX and small residues of the penetrant. These explosive reactions occur as detonations caused by impact shock or vibration.

The reactivity of a liquid material with LOX is generally determined by a so-called impact test, in which a small specimen of the material is placed in an aluminum cup along with liquid oxygen. The cup is placed on a steel anvil and a hardened steel ram is dropped into the cup to produce an impact energy of about 75 pound feet. A reaction in this test will produce a violent explosion; hence, the test specimens are made quite small. Usually, a series of at least twenty "drops" are made in the test for LOX reactivity, and for a material to pass the test as being completely nonreactive, no reactions should be observed in any of the drops.

Attempts have been made in the past to provide inspection penetrant process materials which will be essentially nonreactive with LOX. For example, water or mixtures of glycols and water have been tried as substitutes for the conventional oily penetrant vehicles. However, it turns out that the ability of such liquid materials to depress LOX-reactivity depends on the presence of water, and when the water evaporates, the residues of penetrant become once again reactive with LOX.

I have discovered that it is possible to prepare a nonvolatile liquid penetrant material which will exhibit a LOX-safety feature while at the same time providing excellence in flaw detection capability. In addition, I have found that similar liquid materials, without any indicator dye, may be used as dilution-expansion developers in accordance with the method of my now-issued Patent No. 3,184,596 for Flaw Detection Method Using a Liquid Solvent Developer, and that such developers will also exhibit a LOX-safety feature.

The principal object of the invention, therefore, is to provide an inspection penetrant process which exhibits a feature of LOX safety.

Another object of the invention is to provide penetrant process materials which are nonreactive to liquid oxygen.

Still another object of the invention is to provide a method and means whereby the reactivity to liquid oxygen of penetrant ingredients is depressed or quenched.

A further object of the invention is to provide a method of providing high concentrations of indicator dyes in LOX-nonreactive inspection penetrant compositions.

A still further object of the invention is to provide a dilution-expansion developer for use in a LOX-usage penetrant system, which developer is nonreactive to liquid oxygen.

These and other objects of the invention will become more apparent from the following specification thereof.

The method of this invention involves four essential steps. In addition, at least one supplemental step may be carried out, as desired. Firstly, there is the step of applying to a test surface a specially prepared LOX-nonreactive penetrant consisting essentially of a nonvolatile fluorocarbon liquid and a volatile diluent containing a dissolved indicator dye. Secondly, there is the step of removal of the volatile diluent of the penetrant by evaporation to provide an increase in concentration of the indicator dye. Thirdly, there is the step of removing surface penetrant using a rinse of a volatile halogenated hydrocarbon, and, fourthly, there is the step of inspecting the test surface for the presence of defect indications.

In addition to the above-described four essential steps, an additional supplemental developer step may be carried out. Conventional powder-type developers can be made nonreactive to LOX, and they will function reasonably well with a fluorocarbon-type penetrant as described in the examples given below. However, where maximum sensitivity in development is wanted, a dilution-expansion developer should be used.

Dilution-expansion developers are described in detail in the above-mentioned Patent No. 3,184,596. For the purpose of this invention, a special type of LOX-nonreactive dilution-expansion developer must be employed, this being formulated as described in the following examples by using a nonvolatile fluorocarbon component and a volatile halocarbon extender liquid.

I have found that various nonvolatile fluorinated hydrocarbons, sometimes called "fluorocarbons," which are fluid or semi-fluid at room temperature, are nonreactive to LOX and may be adapted to use as vehicles for inspection penetrants. They exhibit desirable characteristics of viscosity and stability against evaporation which permit them to be used effectively both as penetrants and as developers. Fluorinated hydrocarbons are supplied by Hooker Chemical Co. under the trade name "Fluorolube," or by Minnesota Mining and Manufacturing Co. under the trade name "Kel-F." They are supplied in a range of molecular weights and viscosities, a wide range of viscosities being suitable for the purpose of this invention. The "Fluorolube" and "Kel-F" fluorocarbons are oily materials having the appearance of a light or heavy oil or a grease, depending on the molecular weight. Chemically, the "Kel-F" and "Fluorolube" compounds are linear polymers of trifluorovinyl chloride. Vapor pressures are below about 250 microns Hg at 100° F.

While fluorinated hydrocarbons have the advantage of being nonreactive to LOX, they have the disadvantage of being poor solvents for many dyes. Hence, if a fluorocarbon material is to be used as a carrier for an indicator dye, the dye used must be selected for its solubility in the fluorocarbon. Any of the following representative dyes, or dye-type materials, are suitable for use as indicators in a penetrant utilizing a fluorocarbon ingredient.

1,1,4,4-tetraphenyl-1,3-butadiene
Fluoranthene
Uvitex OB Dye—Ciba Co.
Uvitex NA Dye—Ciba Co.
Leucophor SF Dye—Sandoz Co.
Leucophor DC Dye—Sandoz Co.
Blancol 61690 Dye—Holliday Co.
Fluorol OB Dye—Gen. Dye Co.
Fluorol 7GA Dye—Gen. Dye Co.
Fluor. Green G-115 Dye—OX Color Works
Anthraquinone Green G Base Dye—Du Pont Co.
Oracet Blue B Dye—Ciba Co.

All known dyes are organic in their chemical character, and are, therefore, reactive with LOX. However, I have discovered that if a normally LOX-reactive dye is dissolved in a fluorocarbon material, its reactivity with LOX is quenched. The relative proportions of fluorocarbon with respect to the dye content of the mixture appears to be immaterial so long as the dye is completely dissolved and remains dissolved in the fluorocarbon, or suspended as a colloidal dispersion. Accordingly, I have found it possible to select dye materials, either fluorescent or nonfluorescent, or both, which are soluble in fluorocarbon materials, and which are capable of providing dimensional sensitivity characteristics suitable for usage in inspection penetrant processes. At the same time, the LOX-reactivity of the dye is quenched by the presence of the fluorocarbon.

The effect of dimensional sensitivity of dye indicators in penetrants is described in detail in my now-issued patents, No. 3,107,298, for Apparatus for the Measurement of Fluorescent Tracer Sensitivity, No. 3,300,642, for Method for Changing and Restoring the Sensitivity Characteristic of diluted Penetrants, and No. 3,386,920, for Process for Fluorescence Detection of Extremely Small Flaws. According to the disclosure in the above-identified patents, it will be seen that the dimensional sensitivity or flaw detection capability of a penetrant is a function of the concentration of the indicator dye which is employed. Also, in order to achieve a relatively high level of flaw detection sensitivity, the dye concentration must be relatively high. Hence, in order to formulate a high sensitivity penetrant employing a fluorocarbon carrier material, it is necessary to select a dye indicator which can be dissolved in the fluorocarbon to an appropriate high concentration.

It will be noted from the examples which follow that I have devised a method of achieving a high concentration of dye in a fluorocarbon carrier whereby the dye and the nonvolatile fluorocarbon carrier are both dissolved in a relatively large quantity of a volatile halocarbon such as methylene chloride. Then, after the thus-prepared liquid is applied to the surface of a test part, the volatile halocarbon evaporates and the dimensional sensitivity of the dye moves along its dilution curve, as set forth in the method of my above-named Patent No. 3,300,642. This technique of achieving a high concentration of dye produces dye mixtures in the fluorocarbon carrier which are stable and LOX-nonreactive even though they may approach or exceed the point of normal saturation of solution.

The following examples illustrate various formulations of penetrants and developers which embody the method and means of the invention. In all cases, the compositions are nonreactive with LOX, and each of the inspection methods utilizing these formulations provides a proper level of flaw detection sensitivity along with a LOX-safety feature.

Example No. 1

A nonfluorescent LOX-usage pentrant formulation was prepared as follows:

Oracet Blue B (Ciba Co.) C.I. Solvent Blue
  19 _____grams__ 16
Fluorolube S-30 _____cc__ 128
Methylene chloride, to make 1 gallon.

The above composition was applied to a test surface by spray. The layer of applied penetrant was allowed to stand for a few minutes until all of the methylene chloride ingredient evaporated, after which the test surface was cleaned by a brief rinse and wipe application of trichloroethylene remover. The test surface was then dried by evaporation of the trichloroethylene and a thin coating of developer was applied, to developer having been prepared in accordance with the following formulation:

Grams
Fluorolube S-30 _____ 80
Silico aerogel _____ 80
Methylene chloride, to make 1 gallon.

Examination of the developed test surface revealed clearly visible blue indications of surface cracks. Tests of each of the three process materials, penetrant, remover, and developer, by the standard impact test, showed that they were nonreactive to LOX. Comparison of the flaw detection sensitivity of this LOX-safe system with that obtained by use of conventional oil-phase penetrant systems showed that the LOX-safe system satisfies the sensitivity requirements of Military Specification MIL-I-25135C(ASG), Group 1.

Example No. 2

A fluorescent LOX-usage penetrant formulation was prepared as follows:

Blancophor AW (Gen. Dye) C. I. Brightening
  Agent 68 _____grams__ 18
Kel-F fluorocarbon _____cc__ 128
1,2-trichloro-1,2-trifluoroethane, to make 1 gallon.

The above-described penetrant was applied to a test surface in the same manner as described in Example No. 1 above, along with the evaporation, remover, and developer steps as described in Example No. 1, except that in the developer formulation, a small amount (about .2 gram per gallon) of an ultraviolet absorber dye, Uvinul 490, made by Calco Chemical Co., was added to quench residual background fluorescence which sometimes occurs in the developer mixture. This addition of ultraviolet absorber was made in accordance with the teachings of my copending application Ser. No. 699,536, filed Jan. 22, 1968 for Method of Masking Fluorescence in Fluorescent Dye Tracer Inspection Process Materials. After devcelopment, examination of the test surface under ultraviolet light revealed fluorescent indications of microcracks. Comparison of flaw detection sensitivity with other types of penetrant systems showed that the sensitivity with other types of pentrant systems showed that the sensitivity of this LOX-safe system satisfies the requirements of MIL-I-25135C(ASG), Group VI. Again, it was found that all elements of the system were LOX-nonreactive.

Example No. 3

A dual-sensitivity pentrant was prepared as follows:

Oracet Blue B (Ciba Co.) (visible blue) __grams__ 16
Uvitex OB (Ciba Co.) (fluorescent blue) __do____ 32
Fluorolube S-30 _____cc__ 128
Methylene chloride, to make 1 gallon.

The above penetrant was applied in an inspection process in the same manner as in the foregoing examples, using the same evaporation, remover, and developer steps as described. An ultraviolet absorber dye was used in the developer as described in Example No. 2 above. After development, examination under white light revealed blue indications of relatively large cracks in the test surface, and inspection under ultraviolet light revealed fluorescent indications of micro-flaws. The visible blue level of sensitivity was found to correspond to Group I of MIL-I-25135C(ASG), while the fluorescent level of sensitivity was found to correspond to Group VI of the MIL-Specification. Again, it was found that all elements of the system were nonreactive with LOX.

The dual-sensitivity penetrant of Example No. 3, above, has a dye structure consisting of two dyes, one fluorescent and the other having a visible color. These dyes are present in the penetrant carrier liquid in appropriate concentations such that each dye exhibits a distinctly different dimensional characteristic of color or fluorescence transitions. In this manner, the penetrant, as described in the example, exhibits a low level of dimensional sensitivity with respect to the visible blue dye, while the fluorescent blue dye component exhibits a high level of dimensional sensitivity. Dual-sensitivity penetrants are described and claimed in my copending application, Ser. No. 444,660, filed Apr. 1, 1965.

In each of the above-described examples, the developer step may be omitted. With such an omission, the effective flaw detection sensitivity will be substantially reduced, although the inspection process will still be operable. Also, in each of the above examples, it was found that different nonvolatile fluorocarbon liquids or greases having different viscosities could be substituted for the fluorocarbons indicated. In addition, it was found that a variety of indicator dyes could be substituted for those used in the examples, except that certain of the conventional oil soluble dyes, such as Oil Red O, for example, cannot be used successfully in the formulations for the reason that the solubility of the dye in the fluorocarbon is poor with the result that indications fail to show color properly and fail to develop properly.

The volatile solvent liquids used in the penetrants and the developers and the solvent removers of the examples may be replaced by any one or a combination of volatile halocarbon liquids, a few examples of such liquids being:

trichlorofluoromethane
trichloro-trifluoroethane
1,1,1-trichloroethane
1,1,2-trichloroethane
1,1,2-trichloroethylene
1,1,2,2-tetrachloroethylene (perchloroethylene)
chloroform
carbon tetrachloride
methylene chloride
1,2-dibromo-1,2-tetrafluoroethane
1,2-difluoro-1,2-tetrachloroethane
1,2-trifluoro-1,2-trichloroethane It is apparent that other volatile liquids might be used such as acetone, nitroethane, various alcohols, etc., and if such solvents are removed completely by evaporation, then there would be no LOX-reactive residues left on test surfaces. I have found that halogenated liquids, as listed above, are preferable for the purpose of the invention, since there is less likelihood that such solvents would contain LOX-reactive contaminants.

It is, of course, obvious that the volatile solvent liquid selected for use as a penetrant diluent, as a solvent remover, or as an ingredient in the developer, must be a co-solvent for both the nonvolatile uorocarbon and for the indicator dye. In this manner, both the fluorocarbon material and the indicator dye will be carried into solution together.

Although the inventon has been described with reference to particular embodiments thereof, it will be understood that various changes may be made therein without departing from the spirit of the invention or the scope of the appended claims.

I claim:

1. A method of penetrant inspection of LOX-usage parts comprising the steps of applying to test parts a penetrant consisting essentially of a nonvolatile fluorocarbon carrier material, a volatile diluent, and at least one dissolved indicator dye, removing said volatile diluent by evaporation, removing surface penetrant with a volatile cleaning solvent, and inspecting the surface of said test parts for the presence of defect indications.

2. A method of penetrant inspection of LOX-usage parts comprising the steps of applying to test parts a penetrant consisting essentially of a nonvolatile fluorocarbon carrier material, a volatile diluent, and at least one dissolved indicator dye, removing said volatile diluent by evaporation, removing surface penetrant with a volatile cleaning solvent, applying a developer consisting essentially of a nonvolatile fluorocarbon material and a volatile diluent, and inspecting the surface of said test parts for the presence of defect indications.

3. A method of providing a high concentration of indicator dye in a nonvolatile fluorocarbon inspection penetrant carrier material comprising the steps of simultaneously dissolving the said fluorocarbon and said indicator dye in a volatile halocarbon solvent, applying said volatile halocarbon solution to test surfaces, and removing the volatile halocarbon liquid by evaporation.

4. A method in accordance with claim 1 in which said volatile diluent is a volatile halogenated hydrocarbon liquid.

5. A method in accordance with claim 2 in which said volatile diluents are volatile halogenated hydrocarbon liquids.

6. In a LOX-usage inspection penetrant process, a family of process materials consisting of a penetrant and a solvent remover, said penetrant consisting essentially of a nonvolatile fluorocarbon carrier material, a volatile diluent, and at least one indicator dye, and said solvent remover consisting entirely of a volatile cleaning liquid which is a co-solvent for the said nonvolatile fluorocarbon and the said indicator dye.

7. In a LOX-usage inspection penetrant process, a family of process materials consisting of a penetrant, a solvent remover and a developer, said penetrant consisting essentially of a nonvolatile fluorocarbon carrier material, a volatile diluent, and at least one dissolved indicator dye, said solvent remover consisting entirely of a volatile cleaning liquid which is a co-solvent for the said nonvolatile fluorocarbon and the said indicator dye, and said developer consisting essentially of a nonvolatile fluorocarbon material and a volatile diluent.

8. A method in accordance with claim 1 in which said indicator dye is at least one member selected from the group consisting of fluorescent dyes and nonfluorescent visible-color dyes.

9. A method in accordance with claim 2 in which said indicator dye is at least one member selected from the group consisting of fluorescent dyes and nonfluorescent visible-color dyes.

10. A method in accordance with claim 3 in which said indicator dye is at least one member from the group consisting of fluorescent dyes and nonfluorescent visible-color dyes.

11. A family of process materials in accordance with claim 6 in which said indicator dye is at least one member selected from the group consisting of fluorescent dyes and nonfluorescent visible-color dyes.

12. A family of process materials in accordance with claim 7 in which said indicator dye is at least one member selected from the group consisting of fluorescent dyes and nonfluorescent visible-color dyes.

References Cited

UNITED STATES PATENTS 3,418,078  12/1968  Mlot-Fijalkowski ___ 250—71 X

RALPH G. NILSON, Primary Examiner

D. L. WILLIS, Assistant Examiner

U.S. Cl. X.R.

252—301.2, 408

UNITED STATES PATENT OFFICE
CERTIFICATE OF CORRECTION

Patent No. 3,489,898 January 13, 1970

James R. Alburger

It is certified that error appears in the above identified patent and that said Letters Patent are hereby corrected as shown below:

Column 1, line 36, "Fluorescene" should read -- Fluorescence --; lines 37 and 38, "now Patent No. 3,228,208" should read -- now abandoned --.

Signed and sealed this 8th day of December 1970.

(SEAL)
Attest:

Edward M. Fletcher, Jr.
Attesting Officer

WILLIAM E. SCHUYLER, JR.
Commissioner of Patents